US010318466B2

(12) United States Patent
Krutsch et al.

(10) Patent No.: US 10,318,466 B2
(45) Date of Patent: Jun. 11, 2019

(54) METHOD AND APPARATUS FOR HANDLING OUTSTANDING INTERCONNECT TRANSACTIONS

(71) Applicant: NXP USA, Inc., Austin, TX (US)

(72) Inventors: Robert Krutsch, Munich (DE); Christian Tuschen, Bayern (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/628,334

(22) Filed: Jun. 20, 2017

(65) Prior Publication Data

US 2018/0129624 A1 May 10, 2018

(30) Foreign Application Priority Data

Nov. 10, 2016 (EP) .................... 16198204

(51) Int. Cl.
| | |
|---|---|
| G06F 11/07 | (2006.01) |
| G06F 13/42 | (2006.01) |
| G06F 13/36 | (2006.01) |
| G06F 13/40 | (2006.01) |
| G06F 15/76 | (2006.01) |
| G06F 13/38 | (2006.01) |

(52) U.S. Cl.
CPC ...... *G06F 13/4221* (2013.01); *G06F 11/0745* (2013.01); *G06F 11/0793* (2013.01); *G06F 13/36* (2013.01); *G06F 13/385* (2013.01); *G06F 13/4022* (2013.01); *G06F 13/4036* (2013.01); *G06F 13/42* (2013.01); *G06F 15/76* (2013.01)

(58) Field of Classification Search
CPC ................................................ G06F 11/0793
See application file for complete search history.

(56) References Cited

U.S. PATENT DOCUMENTS

| | | | | |
|---|---|---|---|---|
| 4,930,069 A | * | 5/1990 | Batra | .................. G06F 15/161 709/203 |
| 6,246,666 B1 | * | 6/2001 | Purcell | ................... H04L 67/42 370/221 |
| 6,496,890 B1 | | 12/2002 | Azevedo et al. | |
| 6,601,187 B1 | * | 7/2003 | Sicola | ................. G06F 11/2071 711/162 |
| 9,449,008 B1 | * | 9/2016 | Oikarinen | ......... G06F 17/30292 |
| 2016/0062941 A1 | | 3/2016 | Darbari | |
| 2016/0231948 A1 | * | 8/2016 | Gupta | .................. G06F 3/0611 |

FOREIGN PATENT DOCUMENTS

DE 102015108689 A1 12/2015

* cited by examiner

*Primary Examiner* — Farley Abad

(57) ABSTRACT

A method and apparatus for handling outstanding interconnect transactions between a master device and an interconnect component. For example, a transaction intervention module coupled to an interconnect component and a master device of the interconnect component. The transaction intervention module is arranged to receive an indication of a functional state of the master device. If the master device is indicated as being in a faulty functional state the transaction intervention module is further arranged to determine whether any interconnect transactions initiated by the master device with the interconnect component are outstanding. If it is determined that at least one interconnect transaction initiated by the master device is outstanding, the transaction intervention module is arranged to finalize the at least one outstanding interconnect transaction with the interconnect component.

20 Claims, 4 Drawing Sheets

METHOD AND APPARATUS FOR HANDLING OUTSTANDING INTERCONNECT TRANSACTIONS

FIELD OF THE INVENTION

This invention relates to a method and apparatus for handling outstanding interconnect transactions.

BACKGROUND OF THE INVENTION

An integrated processor system, such as System-on-Chip devices, typically comprises one or more interconnect components used to enable the transfer of data between various other components of the processor system. Such an interconnect component may consists of a bus, crossbar switch, switching fabric, etc.

Components connected via such an interconnect component are typically divided into two types: interconnect master devices and interconnect slave devices. Interconnect master devices typically include, for example, processor cores, direct memory access (DMA) units, etc. arranged to initiate transactions over the interconnect component(s) to send data to and/or request data from interconnect slave devices. Interconnect slave devices typically include components providing memory-mapped resources such as, for example, memory blocks, peripheral components, external interfaces, etc.

Due to unforeseen issues, a master device can hang, or otherwise become unresponsive and enter a failure state in which the master device is unable to handle active and outstanding interconnect transactions (transactions issued by the master device before going into the failure state). This can lead to a system-level deadlock as the interconnect component tries to serve outstanding transactions to the unresponsive master device.

In a conventional system, such a system-level deadlock is recoverable through a system restart. A full system restart leads to a long response time whilst the system restarts. In safety sensitive industries such as the automotive industry, there is a trend away from 'Fail Safe' systems, in which a system is put into a safe (restricted) mode when a fault is detected, towards 'Fault Tolerant' systems that enable less restricted operation upon a fault occurring and that support higher levels of functional availability during fault conditions. Accordingly, the need to perform a system restart to recover from a system-level deadlock conflicts with the desired move towards fault tolerant systems that support higher levels of functional availability during fault conditions.

SUMMARY OF THE INVENTION

The present invention provides a transaction intervention module, a processing device and a method of handling outstanding interconnect transactions as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention is herein described with reference to the accompanying drawings in which there are illustrated example embodiments. However, it will be appreciated that the present invention is not limited to the specific examples herein described and as illustrated in the accompanying drawings.

Figure 1:
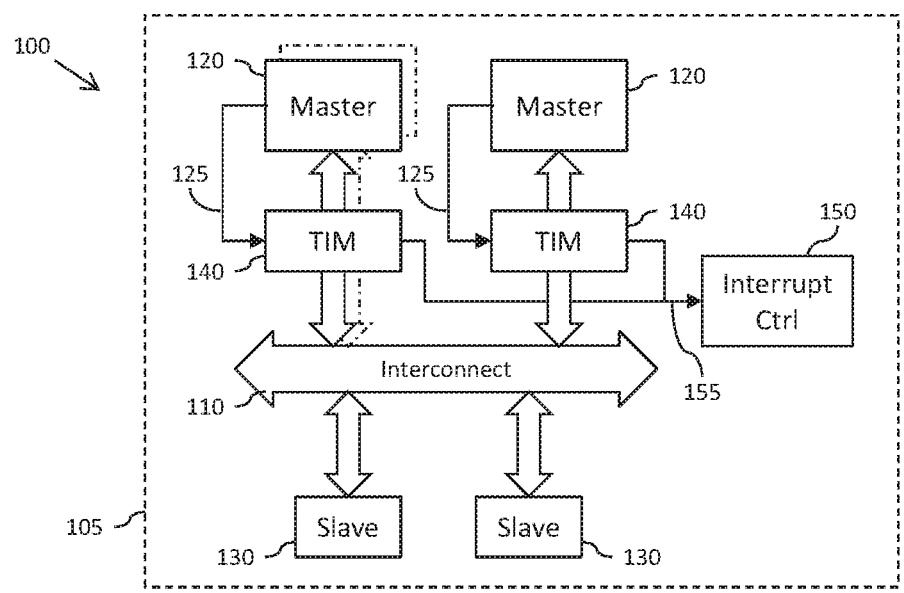
FIG. 1 illustrates a simplified block diagram of an example embodiment of a processing device.

FIG. 1 illustrates a simplified block diagram of an example embodiment of a processing device 100. The processing device 100 may comprise, for example, a System-on-Chip (SoC) device, microcontroller unit (MCU), microprocessor device, etc., and in the illustrated example is implemented within a semiconductor device illustrated generally at 105.

In the illustrated example, the processing device 100 comprises an interconnect component 110. Such an interconnect component 110 may be implemented in any suitable manner, for example by way of a bus, crossbar switch, switching fabric etc. The interconnect component 110 comprises a number of master devices 120, for example consisting of one or more central processing unit(s), one or more graphics processing unit(s) (GPU), one or more direct memory access (DMA) unit(s), etc. The interconnect component 110 further comprises a number of slave devices 130, for example consisting of one or more memory-mapped resources such as memory blocks, peripheral components, external interfaces, etc. The interconnect component 110 is arranged to enable the transfer of data between master and slave devices 120, 130. In particular, each master device 120 is arranged to initiate transactions over the interconnect component 110 to send data to and/or request data from the slave devices 130.

The processing device 100 illustrated in FIG. 1 further comprises transaction intervention modules 140. Each transaction intervention module 140 is coupled between the interconnect component 110 and one or more of the master devices 120. Each transaction intervention module 140 is arranged to receive an indication 125 of a functional state of the (or each) master device 120 coupled thereto and if the master device 120 is indicated as being in a faulty functional state the transaction intervention module 140 is further arranged to finalise outstanding interconnect transactions initiated by the (in-fault) master device 120. In this manner, should a master device 120 hang, or otherwise become unresponsive, and enter a failure state whereby it is unable to handle active and outstanding transactions issued before going into the failure state, the transaction intervention module 140 coupled to the in-fault master device 120 is able to finalise outstanding interconnect transactions, thereby preventing a system-level deadlock caused by the interconnect component 110 trying to serve outstanding transactions to the unresponsive master device 120, and thus avoiding the need for a full system restart to recover from such a system-level deadlock.

In some embodiments, upon determining that an interconnect transaction initiated by the in-fault master device 120 is outstanding, the transaction intervention module 140 may be arranged to determine whether the outstanding interconnect transaction comprises a write transaction, and if it is determined that the outstanding interconnect transaction comprises a write transaction to provide data to the interconnect component 110 to finalise the outstanding write transaction. For example, the transaction intervention module 140 may be arranged to provide a predefined (generic) data pattern to the interconnect component 110 to finalise the outstanding write transaction. Alternatively, and as described in greater detail below, the transaction intervention module may be arranged to provide previously buffered transaction data to the interconnect component 110 to finalise the outstanding write transaction.

In some embodiments, upon determining that an interconnect transaction initiated by the in-fault master device 120 is outstanding, the transaction intervention module 140 may be arranged to determine whether the outstanding interconnect transaction comprises a read transaction. If it is determined that the outstanding interconnect transaction comprises a read transaction, the transaction intervention module 140 may then be arranged to detect returning data for the outstanding read transaction, and finalise the outstanding read transaction. In some examples, the transaction intervention module 140 may be arranged to store the returning data for the outstanding read transaction within at least one memory element, for example such that the stored data is available for subsequent debugging purposes and/or available upon the in-fault master device 120 being recovered to an operational state.

In some embodiments, the transaction intervention module 140 may be arranged to monitor an interface between the master device(s) 120 and the interconnect component, maintain at least one transaction counter for outstanding interconnect transactions initiated by the (or each) master device, and upon determining that the master device 120 is in a faulty functional state to determine whether any interconnect transactions initiated by the in-fault master device 120 with the interconnect component 110 are outstanding based on the transaction counter(s).

In some embodiments, the transaction intervention module 140 may be arranged to generate a fault recovery signal when all outstanding transactions initiated by the in-fault master device 120 have been finalised. For example, the transaction intervention module 140 may be arranged to generate an interrupt signal to higher level logic, for example via an interrupt controller 150 (FIG. 1) to indicate to the higher level logic that fault recovery is required for the in-fault master device 120.

Interconnect protocols typically implement timing constraints for transactions, whereby a transaction is required to be completed within a limited amount of time. Accordingly, in some embodiments if a master device 120 is indicated as being in a faulty functional state, the respective transaction intervention module 140 may be further arranged to initiate a timer to expire after a period of time corresponding to, for example, the time limit within which transactions are required to complete, and to generate a fault recovery signal upon the first to occur of i) expiry of the timer; and ii) all outstanding transactions initiated by the in-fault master device 120 being finalised.

Figure 2:
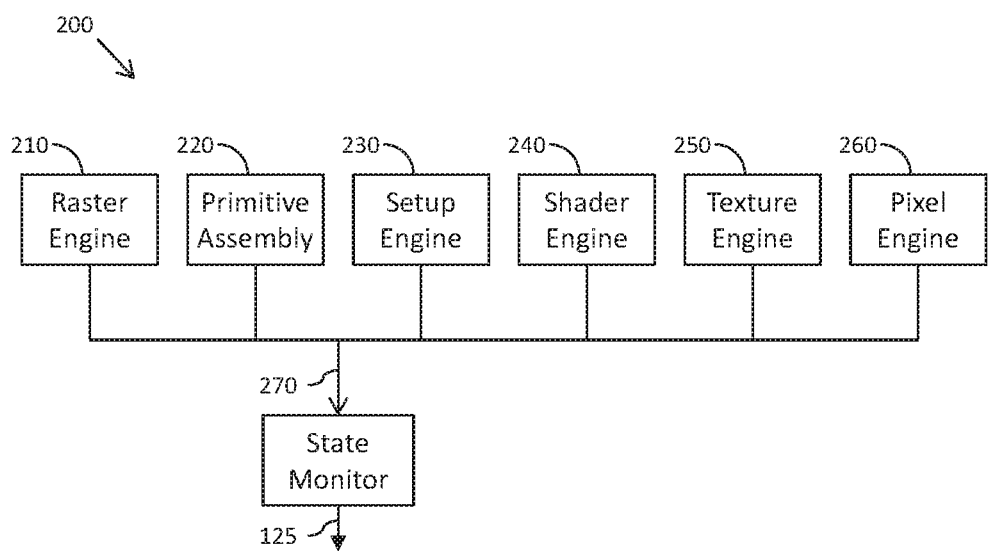
FIG. 2 illustrates a simplified block diagram of a part of a graphics processing unit (GPU).

In the example embodiment illustrated in FIG. 1, the indications 125 of the functional states of the master devices 120 are received from the respective master devices themselves, and may be generated in any suitable manner. For example, FIG. 2 illustrates a simplified block diagram of a part of a graphics processing unit (GPU) 200 that may exemplify one of the master devices 120 of the processing device 100 of FIG. 1. The GPU 200 includes various functional elements, which in the example illustrated in FIG. 2 comprise a raster engine 210, a primitive assembly element 220, a setup engine 230, a shader engine 240, a texture engine 250 and a pixel engine 260. Each of the functional elements 210-260 may be arranged to output an active signal 270 indicating whether the respective functional element 210-260 is active. A state monitor component 280 is arranged to receive the activity signals 270 output by the functional elements 210-260 and to monitor the activity signals 270 to detect if the GPU 200 enters a faulty functional state. For example, the state monitor component 280 may be arranged to determine whether a subset of functional elements 210-260 indicated as being active comprises a valid subset of active functional elements 210-260. If the indicated subset of active functional elements 210 260 is not valid (e.g. as a result of a functional element not being active when it should be), the state monitor 280 determines that the GPU 200 has entered a faulty functional state, and outputs an indication 125 to that effect.

Figure 3:
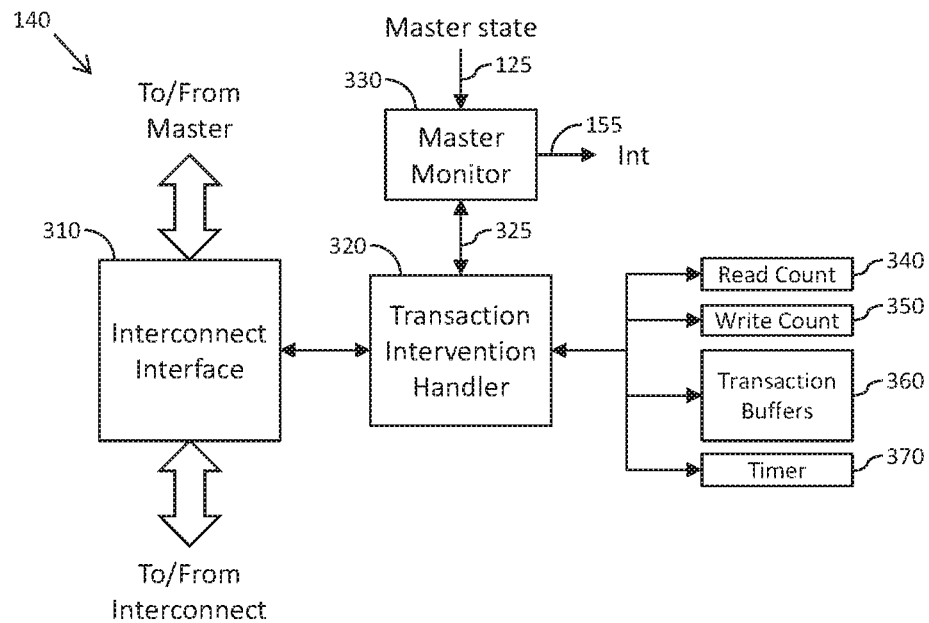
FIG. 3 illustrates a simplified block diagram of an example implementation of a transaction intervention module.

Referring now to FIG. 3, there is illustrated a simplified block diagram of an example implementation of a transaction intervention module 140. In the example illustrated in FIG. 3, the transaction intervention module 140 comprises an interconnect interface component 310 coupled between at least one master device 120 and the interconnect component 110, a transaction intervention handler 320 and a master device monitor component 330.

During a normal (fault-free) operating state, the interconnect interface component 310 is arranged to provide a substantially transparent interface between the master device(s) 120 and the interconnect component 110 through which transaction between the master device(s) 120 and the interconnect pass. Furthermore, during the normal operation, the transaction intervention handler 320 is arranged to monitor transactions passing through the interconnect interface component 310 between ween the master device(s) 120 and the interconnect pass and, in the illustrated example, maintain transaction counters for outstanding interconnect transactions initiated by the master device(s) 120.

Figure 4:
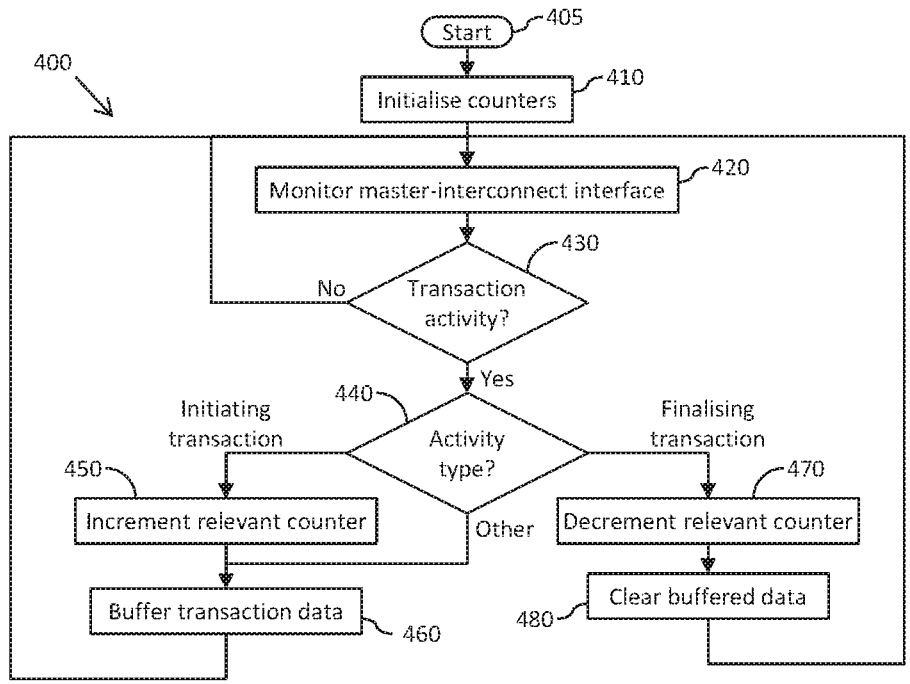
FIGS. 4 to 6 illustrate simplified flowcharts of an example of a method of handling outstanding interconnect transactions between a master device and an interconnect component of a processing device.

FIG. 4 illustrates a simplified flowchart 400 of an example of a part of a method of handling outstanding interconnect transactions between a master device and an interconnect component of a processing device, such as may be implemented within the transaction intervention module 140 of FIG. 2. In particular, FIG. 4 illustrates a simplified flowchart 400 of a part of a method of handling outstanding interconnect transactions that may be implemented within the transaction intervention handler 320 during a normal (fault-free) operating state. The part of the method illustrated in FIG. 4 starts at 405, for example upon initialisation of the processing device 100, and moves on to 410 where transaction counters, such as the read and write transaction counters illustrated generally at 340 and 350 respectively in FIG. 3, are initialised (e.g. set to zero). The method then moves on to 420 where an interface between one or more master devices and an interconnect component, such as provided by the interconnect interface component 310, is monitored in order to detect transaction activity, at 430. In the example illustrated in FIG. 4, monitoring of the interface 310 between the master device(s) 120 and the interconnect component 110 continues until transaction activity on the interface 310 is detected, at which point the method moves on to 440 where in the illustrated example the type of activity detected is determined (e.g. whether the detected activity comprises initiation of a transaction or finalising of a transaction.

If the detected activity is determined to be initiation of a transaction by the respective master device 120, the method moves on to 450 where a relevant transaction counter is incremented (e.g. if the transaction being initiated is a read transaction the read counter 340 may be incremented, conversely if the transaction being initiated is a write transaction the write counter 350 may be incremented). In some example embodiments transaction data may be buffered as illustrated at 460, for example within transaction buffers 360 in the example illustrated in FIG. 3. Such transaction data to be buffered may comprise for example, master device identifier, transaction address, data to be written (in the case of a write transaction), etc. The method then loops back to 420 and monitoring of the interface 310 between the master device(s) 120 and the interconnect component 110 continues.

Referring back to 440, if the detected activity is determined to be finalising of a transaction, the method moves on to 470 where a relevant transaction counter is decremented (e.g. if the transaction being finalised is a read transaction the read counter 340 may be decremented, conversely if the transaction being finalised is a write transaction the write counter 350 may be decremented). In some example embodiments, transaction data previously buffered for the transaction being finalised may be cleared, as illustrated at 480. The method then loops back to 420 and monitoring of the interface 310 between the master device(s) 120 and the interconnect component 110 continues.

Referring back to 440 again, if the detected activity is determined to be other than initiation or finalising of a transaction (e.g. the detected activity is part of a burst transaction), transaction data may optionally be buffered at 460 and the method then loops back to 420 (without updating a transaction counter) and monitoring of the interface 310 between the master device(s) 120 and the interconnect component 110 continues.

Referring back to FIG. 3, the master device monitor component 330 is arranged to receive the indication 125 of a functional state of the (or each) master device 120 to which the interconnect interface component 310 is coupled, and upon said indication 125 indicating that the respective master device 120 as being in a faulty functional state, the master device monitor component 330 is arranged to signal the transaction intervention handler 320 to initiate transaction intervention.

Figure 5:
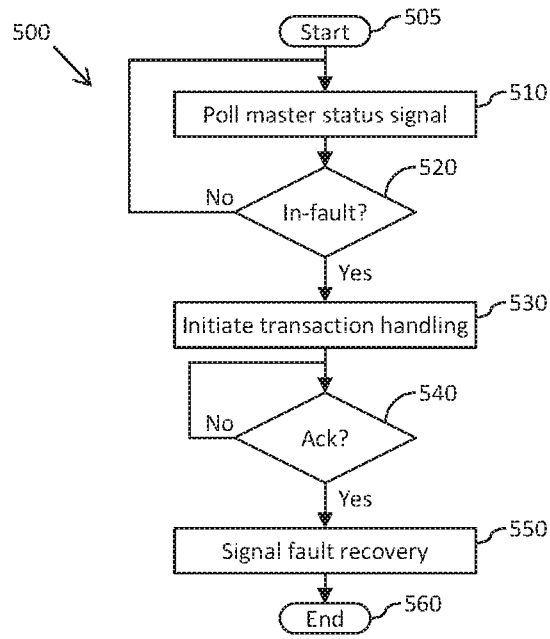

FIG. 5 illustrates a simplified flowchart 500 of an example of a further part of the method of handling outstanding interconnect transactions between a master device and an interconnect component of a processing device, such as may be implemented within the transaction intervention module 140 of FIG. 2. In particular, FIG. 5 illustrates a simplified flowchart 500 of a part of a method of monitoring a functional state of the (or each) master device 120 to which the interconnect interface component 310 is coupled that may be implemented within the master device monitor component 330. The part of the method illustrated in FIG. 5 starts at 505, for example upon initialisation of the respective master device 120, and moves on to 510 where a signal indicating a functional state of the respective master device 120, such as the indication 125 in FIGS. 1 and 2, is polled in order to detect whether the master device 120 is in a faulty functional state, at 520. In the example illustrated in FIG. 5, polling of the signal indicating a functional state of the respective master device 120 continues until a faulty functional state of the master device 120 is indicated, at which point the method moves on to 530 where transaction handling is initiated, for example by way of signalling the transaction intervention handler 320 to initiate transaction intervention in the example embodiment illustrated in FIG. 3. In the example illustrated in FIG. 5, the method then waits until an acknowledgement that transaction intervention has been completed is received, at 540. Upon receipt of such an acknowledgement, the method may then comprise signalling fault recovery, for example by way of an interrupt signal 155 to higher level logic (not shown) to indicate to the higher level logic that fault recovery is required for the in-fault master device 120. This part of the method then ends, at 560.

Figure 6:
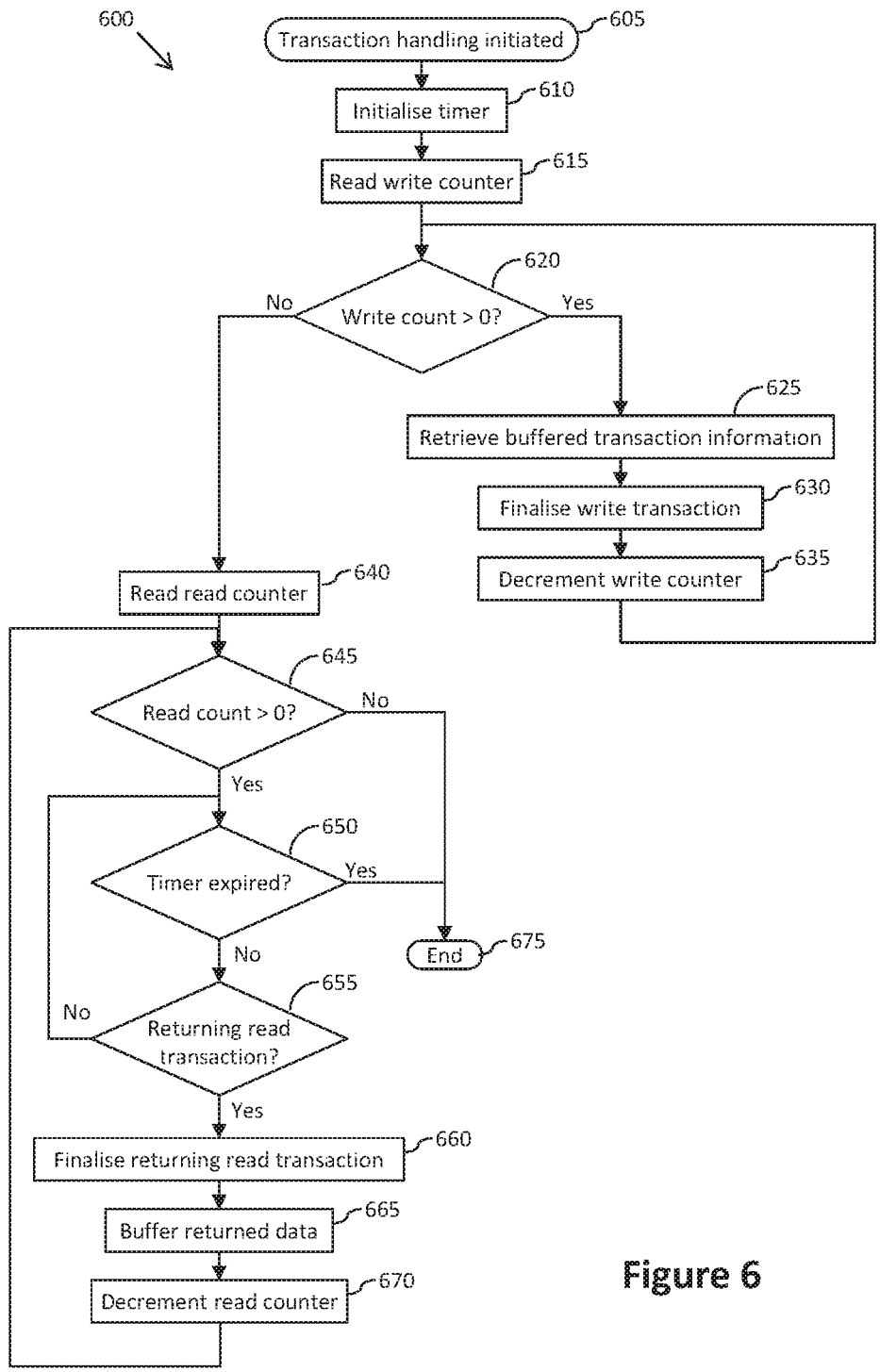

Referring back to FIG. 3, as described above, upon the indication 125 indicating that the respective master device 120 is in a faulty functional state, the master device monitor component 330 is arranged to signal the transaction intervention handler 320 to initiate transaction intervention. FIG. 6 illustrates a simplified flowchart 600 of an example of a still further part of the method of handling outstanding interconnect transactions between a master device and an interconnect component of a processing device, such as may be implemented within the transaction intervention module 140 of FIG. 2. In particular, FIG. 5 illustrates a simplified flowchart 500 of a part of a method of transaction intervention that may be implemented within the transaction intervention handler 320.

This part of the method starts at 605 upon transaction handling being initiated, for example by way of a transaction handling initiation signal 325 (FIG. 3) being received from the master device monitor component 330. In the illustrated example, a timer is initialised at 610, such as the timer illustrated at 370 in FIG. 3. A write counter, such as the write counter 350 illustrated in FIG. 3, is read to determine whether any write transactions initiated by the in-fault master device 120 are outstanding. If the write counter value indicates that at least one write transaction initiated by the in-fault master device 120 is outstanding, the method moves on to 625 where, in the illustrated example, buffered transaction information for an outstanding write transaction is retrieved from, in the example illustrated in FIG. 3, the transaction buffers 360. The outstanding write transaction for which buffered transaction information was received is then finalised at 630. For example, a predefined (generic) data pattern may be provided to the interconnect component 110 to finalise the outstanding write transaction. Alternatively, previously buffered transaction data (retrieved at 625) may be provided to the interconnect component 110 to finalise the outstanding write transaction. Having finalised the outstanding write transaction, the write counter 350 is then decremented at 635, and the method loops back to 620.

Once the write counter value indicates that no write transactions initiated by the in-fault master device 120 are outstanding, the method moves on to 640, where a read counter, such as the read counter 340 illustrated in FIG. 3, is read to determine whether any read transactions initiated by the in-fault master device 120 are outstanding. If it is determined that one or more read transactions are outstanding, the method moves on to 650 where, in the illustrated example, it is determined whether the timer 370 has expired, at 650. If the timer has not expired, the method moves on to 655 where it is determined whether the interconnect component 110 is attempting to return a read transaction to the in-fault master device 120. If it is determined that no outstanding read transaction is being returned, the method loops back to 650 and the method loops until either the timer 370 expires, at which point the method ends at 675, or an outstanding read transaction is returned by the interconnect component 110, at which point the method moves on to 660 where the outstanding read transaction being returned by the interconnect component 110 is finalised. For example, the transaction intervention handler 320 may be arranged to finalise the read transaction being returned by the interconnect component 110 by acknowledging receipt of the returning transaction. In some examples, such as at 665 the example illustrated in FIG. 6, data forming part of the returning read transaction may be stored, for example within the transaction buffers 360 in FIG. 3, such that the stored data is available for subsequent debugging purposes and/or available upon the in-fault master device 120 being recovered to an operational state. The read counter 340 is then decremented, at 670, and the method loops back to 645.

Once the read counter value indicates no read transactions initiate by the in-fault master device 120 are outstanding, the method ends, at 675.

Figure 7:
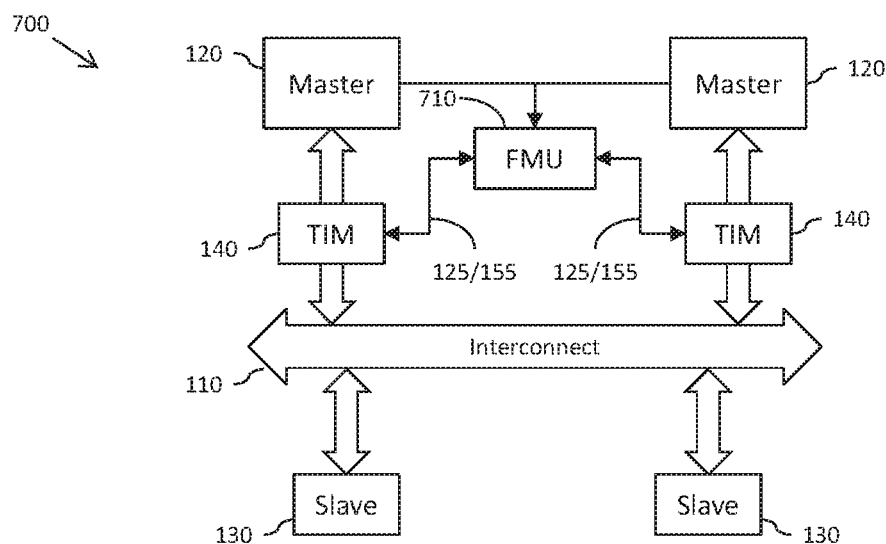
FIG. 7 illustrates a simplified block diagram of an example embodiment of a processing device.

In the example embodiment illustrated in FIG. 1, the indications 125 of the functional states of the master devices 120 are received from the respective master devices 120 themselves. However, it is contemplated that the indications 125 of the functional states of the master devices 120 may be generated by other means. For example, FIG. 7 illustrates a simplified block diagram of alternative an example embodiment of a processing device 700. In the example illustrated in FIG. 7, the indications 125 of the functional states of the master devices 120 are received from a fault management unit 710 arranged to monitor the master devices 120 and to detect when a master device 120 enters a faulty functional state. Upon detecting that a master device 120 has entered a faulty functional state, the fault management unit 710 may then output the respective indication 125 indicating to the appropriate transaction intervention module 140 that the master device 120 has entered a faulty functional state.

In the example illustrated in FIG. 7, upon all outstanding transaction initiated by an in-fault master device 120 being finalised (or upon expiry of the timer 370) the transaction intervention module may be arranged to generate a fault recovery signal 155 which is received by the fault management module 710. In this manner, once all outstanding transactions for the in-fault master unit have been finalised, the fault management module 710 is signalled and may then proceed with initiating recovery of the in-fault master device 120.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processing system comprising:
a transaction intervention module coupled to at least one interconnect component and at least one master device of the at least one interconnect component;
the transaction intervention module is arranged to receive an indication of a functional state of the at least one master device, and if the at least one master device is indicated as being in a faulty functional state the transaction intervention module is further arranged to:
determine whether any interconnect transactions initiated by the at least one master device with the at least one interconnect component are outstanding; and
if it is determined that at least one interconnect transaction initiated by the at least one master device is outstanding, finalise the at least one outstanding interconnect transaction with the at least one interconnect component.

2. The processing system of claim 1, wherein upon determining that at least one interconnect transaction initiated by the at least one master device is outstanding, the transaction intervention module is arranged to:
determine whether the at least one outstanding interconnect transaction comprises a write transaction; and
if it is determined that the at least one outstanding interconnect transaction comprises a write transaction, provide data to the at least one interconnect component to finalise the outstanding write transaction.

3. The processing system of claim 2, wherein if it is determined that the at least one outstanding interconnect transaction comprises a write transaction, the transaction intervention module is arranged to provide data to the at least one interconnect component comprising at least one of:
a predefined default data pattern;
buffered transaction data.

4. The processing system of claim 1, wherein upon determining that at least one interconnect transaction initiated by the at least one master device is outstanding, the transaction intervention module is arranged to:
determine whether the at least one outstanding interconnect transaction comprises a read transaction;
if it is determined that the at least one outstanding interconnect transaction comprises at least one read transaction, detect returning read transactions for the at least one master device; and
upon detecting a returning read transaction for the master device, finalise the detected returning read transaction.

5. The processing system of claim 4, wherein the transaction intervention module is arranged to store the returning data for the at least one outstanding read transaction within at least one memory element.

6. The processing system of claim 1, wherein the transaction intervention module is arranged to:
monitor an interface between the at least one master device and the at least one interconnect component;
maintain at least one transaction counter for outstanding interconnect transactions initiated by the at least one master device; and
determine whether any interconnect transactions initiated by the at least one master device with the at least one interconnect component are outstanding based on the at least one transaction counter.

7. The processing system of claim 6, wherein the transaction intervention module is arranged to:
detect transaction activity between the at least one master device and the at least one interconnect component;
increment the at least one transaction counter, if the detected transaction activity relates to the at least one master device initiating a transaction; and
decrementing the at least one transaction counter, if the detected transaction activity relates to the at least one master device finalising a transaction.

8. The processing system of claim 7, wherein the transaction intervention module is arranged to maintain a read transaction counter and a write transaction counter.

9. The processing system claim 1, wherein the transaction intervention module is arranged to generate a fault recovery signal when all outstanding transactions initiated by the at least one master device have been finalised.

10. The processing system of claim 1, wherein if the at least one master device is indicated as being in a faulty functional state the transaction intervention module is further arranged to initiate a timer and generate a fault recovery signal upon the first to occur of:
expiry of the timer; and
all outstanding transactions initiated by the at least one master device being finalised.

11. A method of handling outstanding interconnect transactions using a transaction intervention module coupled between an interconnect component of a processing device and a master device of the interconnect component; the method comprising receiving an indication of a functional state of the master device, and if the at least one master device is indicated as being in a faulty functional state the method of handling outstanding interconnect transactions using the transaction intervention module further comprising:

determining whether any interconnect transactions initiated by the master device with the interconnect component are outstanding; and if it is determined that the at least one interconnect transaction initiated by the master device is outstanding, finalising the at least one outstanding interconnect transaction with the at least one interconnect component.

12. The method of claim 11, wherein upon determining that at least one interconnect transaction initiated by the master device is outstanding, the method of handling outstanding interconnect transactions using the transaction intervention module further comprises:

determining whether the at least one outstanding interconnect transaction comprises a write transaction; and if it is determined that the at least one outstanding interconnect transaction comprises a write transaction, providing data to the at least one interconnect component to finalise the outstanding write transaction.

13. The method of claim 11, wherein upon determining that at least one interconnect transaction initiated by the master device is outstanding, the method of handling outstanding interconnect transactions using the transaction intervention module further comprises:

determining whether the at least one outstanding interconnect transaction comprises a read transaction;

if it is determined that the at least one outstanding interconnect transaction comprises at least one read transaction, detecting returning read transactions for the master device; and upon detecting a returning read transaction for the master device, finalising the detected returning read transaction.

14. The method of claim 11, wherein the method of handling outstanding interconnect transactions using the transaction intervention module comprises:

monitoring an interface between the master device and the interconnect component;

maintaining at least one transaction counter for outstanding interconnect transactions initiated by the master device; and determining whether any interconnect transactions initiated by the master device with the interconnect component are outstanding based on the at least one transaction counter.

15. A transaction intervention device, comprising:

a connection interface coupled to an interconnect component and to a master device of the interconnect component;

a transaction buffer configured to store data associated with transactions between the interconnect component and the master device;

a transaction handler configured 1) to receive an indication of a functional state of the master device, 2) to determine if a transaction initiated by the master device is outstanding when the indication indicates that the master device is in a fault condition, and 3) to finalize the outstanding transaction when the transaction handler determines that the transaction is outstanding without resetting the master device.

16. The transaction intervention device of claim 15, further comprising:

a read counter configured to maintain a count of outstanding read transactions from the interconnect component to the master device, wherein in determining if the transaction initiated by the master device is outstanding, the transaction handler is further configured to determine that the read counter includes a non-zero number of outstanding read transactions.

17. The transaction intervention device of claim 16, wherein in finalizing the outstanding transaction the transaction handler is further configured to store data from the interconnect component to the transaction buffer.

18. The transaction intervention device of claim 15, further comprising:

a write counter configured to maintain a count of outstanding write transactions from the master device to the interconnect component, wherein in determining if the transaction initiated by the master device is outstanding, the transaction handler is further configured to determine that the write counter includes a non-zero number of outstanding write transactions.

19. The transaction intervention device of claim 18, wherein in finalizing the outstanding transaction, the transaction handler is further configured to send data from the transaction buffer to the interconnect component.

20. The transaction intervention device of claim 15, wherein in finalizing the outstanding transaction the transaction handler is further configured to determine that the outstanding transaction is a write transaction from the master device to the interconnect component, and to send a predefined default data pattern to the interconnect component when the outstanding transaction is a write transaction.

* * * * *